United States Patent [19]

Kaniuk et al.

[11] Patent Number: 4,508,835

[45] Date of Patent: Apr. 2, 1985

[54] VIBRATABLE REFRACTORY MIX AND BINDER THEREFOR

[75] Inventors: John A. Kaniuk, State College, Pa.; William E. Meinking, Alfred; Jeffrey R. Morris, Scio, both of N.Y.

[73] Assignee: Allied Corporation, Morris Township, Morris County, N.J.

[21] Appl. No.: 502,076

[22] Filed: Jun. 8, 1983

[51] Int. Cl.³ .............................................. C04B 35/02
[52] U.S. Cl. ................................ 501/94; 501/88; 501/120; 501/106; 501/103; 501/128; 501/133; 501/132; 106/85
[58] Field of Search .................. 501/88, 94, 106, 103, 501/120, 128, 132, 133; 106/85

[56] References Cited

U.S. PATENT DOCUMENTS

| | | | |
|---|---|---|---|
| 3,582,372 | 6/1971 | Cris et al. | 501/106 X |
| 3,634,566 | 1/1972 | Gates et al. | 301/88 X |
| 3,769,044 | 10/1973 | Horton | 501/133 X |
| 3,793,041 | 2/1974 | Sowman | 501/103 |
| 4,014,704 | 3/1977 | Miller | 501/88 X |
| 4,053,320 | 10/1977 | Williamson et al. | 501/106 X |
| 4,059,453 | 11/1977 | Dittrich et al. | 501/106 X |
| 4,125,409 | 11/1978 | Deno | 501/106 X |
| 4,127,629 | 11/1978 | Weaver et al. | 501/88 X |
| 4,174,331 | 11/1979 | Myles | 501/133 X |
| 4,221,596 | 9/1980 | Rice | 501/133 X |
| 4,248,953 | 2/1981 | Myles | 501/88 X |
| 4,331,773 | 5/1982 | Hongo et al. | 501/133 X |
| 4,332,910 | 6/1982 | Dunworth | 501/106 |

FOREIGN PATENT DOCUMENTS 1027737  3/1978  Canada ................................ 501/106

OTHER PUBLICATIONS

"Ceramic Industry", pp. 66–67, vol. 120, Jan. 1983.

*Primary Examiner*—Howard S. Williams
*Assistant Examiner*—Nam X. Nguyen
*Attorney, Agent, or Firm*—Jay P. Friedenson

[57] ABSTRACT

Vibratable, monolithic refractory mixes useful to form linings for receptacles and related apparatus components used to handle or treat molten metal, such as ladles, tundishes, troughs and runners, including novel binders therefor.

23 Claims, No Drawings

VIBRATABLE REFRACTORY MIX AND BINDER THEREFOR

BACKGROUND OF THE INVENTION

This invention relates to vibratable, monolithic refractory mixes useful to form linings for receptacles and related apparatus components used to handle or treat molten metal, such as ladles, tundishes, troughs and runners.

Vibration forming of refractory linings from vibratable monolithic refractory mixes is widely employed because it provides a facile way of providing a final desired shape which when molded has a uniform texture.

In most of the known vibratable monolithic refractory mixes which are used commercially, clay is used as the binder. Such mixes also contain a $P_2O_5$ source, such as phosphoric acid or mono-aluminum phosphate. Unfortunately, however, such $P_2O_5$ sources react with impurities in the clay to form precipitates which destroy the shelf life of the vibratable mix, that is to say that the mix does not remain vibratable. Shelf life for such clay binded vibratable mixes is often less than one month. The prior art has attempted to solve this problem by incorporating inhibitors or using a non-clay binder as in U.S. Pat. Nos. 4,069,057 and 3,834,914; however, there is a need in the art for improved non-clay containing binders for vibratable refractory mixes which do not require the addition of inhibitors.

It is accordingly an object of this invention to provide an improved non-clay containing binder suitable for use in a vibratable refractory mix to produce an improved non-clay containing vibratable refractory mix which does not require the addition of an inhibitor for good shelf life.

It is another object of this invention to provide an improved non-clay containing vibratable refractory mix which gives good slump resistance when vibrated into forms.

Other objects and advantages of the invention will be apparent from the following description.

SUMMARY OF THE INVENTION

It has been discovered that the objects of the invention are achieved with the following described non-clay containing binder and vibratable refractory mix compositions:

The novel non clay-containing binders of the invention suitable for use in the novel non-clay containing vibratable refractory mixes of the invention comprise a member selected from the group consisting of a cellulose ether, microcrystalline cellulose and polyvinyl alcohol in an amount sufficient to provide slump resistance to said mix after it has been vibrated into a form and the form is removed, a dry colloidal particulate material in an amount sufficient to reduce phosphate migration in said mix after it has been vibrated into a form and cured by heating to a maximum acceptable level to achieve satisfactory physical integrity of the molded refactory product, with the proviso that both components in said blend are present in amounts such that vibratable refractory mixes prepared therefrom flow under the influence of vibration.

The novel binders of the invention have applications other than in vibratable refractory mixes. For example, they may be used as binders for ramming and casting mixes as well as to manufacture preformed refractory shapes.

The novel non-clay containing vibratable refractory mixes of the invention comprise a particulate, non-basic refractory material in an amount sufficient and a sizing suitable to provide refractoriness to said mix, a $P_2O_5$ source in an amount sufficient to form a bond with said non-basic refractory material, a non-clay containing binder in accordance with the binder embodiments of this invention as described above and water in an amount sufficient to provide lubricity to said mix and make it vibratable, but not in an amount which would adversely affect the slump resistance of said mix after it has been vibrated into a form and the form removed.

The novel non-clay containing vibratable refractory mixes of the invention have applications other than as vibratable mixes. For example, they may be used as ramming and casting mixes as well as to manufacture preformed refractory shapes.

DETAILED DESCRIPTION OF THE INVENTION AND THE PREFERRED EMBODIMENTS

The Novel Non Clay-Containing Binders

The function of the cellulose ether, microcrystalline cellulose or polyvinyl alcohol component is to serve as a plasticizer and a lubricant, to enhance thixotropic properties and to achieve slump resistance in the refractory mix.

The cellulose ethers are a known class of materials which are made by reacting cellulose with appropriate chemical reagents in the presence of caustic soda. For example, methylcellulose is prepared using methyl chloride; ethylcellulose is prepared using ethyl chloride; hydroxypropyl methylcellulose is prepared using propylene oxide and methyl chloride and hydroxybutyl methylcellulose is prepared using butylene oxide and methyl chloride. Such cellulose ethers are available commercially in various viscosity types such as from The Dow Chemical Co. under the METHOCEL trademark.

Microcrystalline cellulose is commercially available from FMC Corp under the AVICEL trademark.

Polyvinyl alcohols are a well-known class of materials. Suitable forms may be purchased commercially from E. I. DuPont de Nemours and Co. and others.

The amount of the cellulose ether, microcrystalline cellulose or polyvinyl alcohol component used in the binder is that amount which is sufficient to provide slump resistance to the vibratable refractory mix after it has been vibrated into a form and the form is removed.

For the purpose herein, "slump resistance" is defined as the ability of the vibrated material to retain its shape under a load of 5 megapascals after the form is removed. Slump resistance is readily determined by vibrating a candidate mix into a 2 inch diameter by 4 inch slug and applying an increasing pressure and observing the point at which the slug totally deforms.

Generally, slump resistance may be achieved by adding the cellulose ether, microcrystalline cellulose or polyvinyl alcohol component in an amount of about 0.0005 to about 60% based on the total weight of the binder blend; however, amounts below the 0.0005% level may be effective in a given system and amounts above the 4% level may not be deleterious in a given system. It is thus seen that this range is not critical. The appropriate amount to employ will depend upon factors including the choice of the material used and its viscosity, the identity of the other components in the binder system, and the identity of the other components in the non-binder portion of the vibratable refractory mix. Generally, preferred levels of addition are in the range of about 0.1 to about 10 wt. % based on the total weight of the binder blend.

It is preferable, but not mandatory, to incorporate water with the cellulose ether, microcrystalline cellulose or polyvinyl alcohol component as a dispersing aid. The amount of water to be used will vary with the component and its nature, such as viscosity, but should be sufficient to disperse the component. The appropriate amount in each case can readily be determined by persons skilled in the art, but will generally vary between about 0.5 and about 20 weight % based on the weight of the cellulose ether, microcrystalline cellulose or polyvinyl alcohol component.

The preferred mode of dispersing these components with water is to mix the component thoroughly with 1/5 to ⅓ of the desired total volume of water as hot water (about 80°–90° C.). The remainder of the desired water should then be added as cold water (about 20°–25° C.) or ice. Agitation should continue until all particles are wetted. This procedure assures a smooth dispersion without lumps.

The function of the colloidal particulate material is to serve as a thixotropic agent and as a plasticizer and a lubricant. An important function of this component in the binder blends of the invention is to reduce phosphate migration in the refractory mix after it is vibrated into a form and heated to cure. Phosphate migration results in disruption of the molded refractory bodies, as evidenced by disintegration and macroscopic cracking. In extreme cases phosphate migration can result in explosion of the shapes.

Any dry colloidal particulate material may be used for this purpose. By "colloidal" is intended to mean any material with a particle size less than 0.2 microns exhibiting Brownian motion. Examples of suitable materials are fumed silica, colloidal magnesia-alumina spinel and colloidal silicon carbide. Others will readily occur to persons skilled in the art.

The preferred dry colloidal particulate material is fumed silica. Fumed silica is produced by the flamed hydrolysis of $SiCl_4$. Fumed silica is 99.8% $SiO_2$ and has an average agglomerated particle size of about 0.012 microns. The actual particle size is less than about 0.002 microns. The surface area is 200±25 square meters per gram. Fumed silica is commercially available from The Cabot Co. and DeGussa.

The amount of the colloidal particulate material used in the binder is that amount which is sufficient to reduce phosphate migration in the refractory mix, after it has been vibrated into a form and molded by heating to a maximum acceptable level to achieve satisfactory physical integrity of the molded refractory product. Sufficient reduction of phosphate migration is considered to be achieved, for the purposes herein, when the cured refractory products obtained by heating the vibrated refractory shapes exhibit satisfactory physical integrity, that is to say they do not disintegrate nor do a significant number of these shapes possess macroscopic cracks. This may readily be determined by persons skilled in the art by visual observation.

Generally, sufficiently reduced phosphate migration may be achieved by using the dry colloidal particulate material in an amount of about 40 to about 99.9% and, preferably, about 80 to about 99% based on the total weight of the binder blend.

The amount of dry colloidal particulate material to be used is not absolutely critical as amounts below and above the 40–99.9% range recited above may be able to be employed in particular systems. The appropriate amount will vary depending upon the particular material selected, the other binder component selected as well as the other components of the refractory mix and such can readily be determined by persons skilled in the art.

Optionally, a deflocculating agent is added to the mix in an amount sufficient to disperse the colloidal particulate material component of the binder and prevent it from agglomerating. Any of the well-known deflocculating agents may be used for this purpose. Examples are sodium phosphates such as sodium hexametaphosphate, sodium metaphosphate, sodium tetrasodium phosphate, and sodium silicate and sodium carbonate. The preferred deflocculating agent is sodium hexametaphosphate.

The amount used is that which is sufficient to disperse the colloidal particulate material and prevent it from agglomerating. Such amount will vary depending upon the particular defloccuiant chosen, the particular colloidal material used and the concentration of the latter. The appropriate amount can be readily determined by those of ordinary skill in the art, but the appropriate amount can be expected to fall generally in the range of about 0 to about 35 wt. % and preferably in the range of about 0 to about 5% based on the total weight of the binder blend. An unduly high excess of deflocculating agent may adversely affect the slump resistance of the mix.

The novel non-clay containing binders of the invention may be prepared from the above components by simply blending or mixing the binder components.

The Novel Vibratable Refractory Mixes

The particulate, non-basic refractory material component of the novel vibratable refractory mixes of the invention may be any of the non-basic refractory grains well known in the art. Examples are high alumina aggregates; titanium oxides; zircon; zirconia; alumina silica; carbides such as silicon and tungsten carbide; boron; chromium oxide; carbon such as graphite; magnesia-alumina-spinel, and alumina-chrome oxide. The particular refractory material selected depends on the nature of the refractory application, the size of the container to be lined, the thickness of the lining, the molten metal to be contained and other factors. Such selection is well within the skill of persons familiar with this art. The preferred refractory grain is selected from alumina-silica, silicon carbide, magnesia-alumina-spinel, zircon, zirconia and alumina-chrome oxide. Alumina-silica is the preferred refractory grain and may be used in the form of sillimanite, andalusite, mullite, bauxite, kyanite and tabular alumina.

Particle size and distribution of the refractory grain selected is not critical but will also depend upon consideration of the above factors to optimize the desired results. Such determination is also within the ordinary skill of persons familiar with this art.

Generally, however, the refractory grain is selected and sized to comprise about 40 to about 75% coarse grains in the range of about 3–200 mesh and about 25 to about 60% fine grains of −325 mesh, although sizes and distributions above and below these ranges may be suitable for particular applications.

The amount of the refractory material component used in the vibratable mixes of the invention is that which is sufficient to provide refractoriness to the mix. The refractory component generally comprises the balance of the mix after considering the weight % of all other components. Generally, the refractory component will occupy about 80 to about 98 weight % of the total mix although suitable mixes for some applications may contain an amount of the refractory component above or below this range.

The $P_2O_5$ source component functions to react with the refractory grain when the vibrated shape is heated, to form a bond. Any $P_2O_5$ source which will accomplish this objective without adversely affecting the properties of the molded refractory is suitable. Examples include phosphoric acid, monoaluminum phosphate and monoammonium phosphate at any convenient concentration such as 50, 60, 70, 80 or 85 wt. %.

The amount of $P_2O_5$ source to be added is that which is sufficient to form a bond with the refractory material. Although the amount is not absolutely critical, too little will result in insufficient strength at temperatures below 1000° F., whereas too much will result in reduced refractoriness. The appropriate amount to be added will vary depending upon the nature of the refractory material, the $P_2O_5$ source and other factors. One skilled in the art can readily determine when appropriate bonding has been achieved by performing tests for strength and refractoriness. Generally, the $P_2O_5$ source is used in an amount of about 0.5 to about 14% based on the weight of the refractory material in the mix. In particular applications, higher or lower amounts may prove satisfactory.

The non-clay containing binder component of the vibratable mix is another embodiment of the invention and has been described heretofore.

The amount of the binder component which should be used is that which is sufficient to provide lubricity to the mix and make it vibratable, but not an amount which would adversely affect the slump resistance of the mix after it has been vibrated into a form and the form removed.

The appropriate amount for use will depend on the nature of the particular binder components selected and their proportions, the other components of the mix and the shapes to be formed. This can readily be determined by persons skilled in the art by making samples and testing to ascertain whether they will flow properly upon vibrating and also exhibit satisfactory slump resistance.

Generally, the amount of the binder used ranges from about 0.1 to about 10 parts and preferably from about 2 to about 8 parts per 100 parts of the particulate refractory material in the mix. In particular applications, higher and lower amounts of the binder may be found suitable.

Water is a necessary component of the vibratable refractory mix. Its purpose is to provide lubricity to the mix in combination with the other mix components to render the mix vibratable. Hence, it should be used in an amount sufficient to provide adequate lubricity to the mix (i.e., the mix will flow when vibrated), but not in such an amount so as to adversely affect the slump resistance of the mix after it has been vibrated into a form and the form is removed.

Generally, the amount of water added to the mix is from about 2 to about 10 weight parts water per 100 parts of the particulate refractory material in the mix. Generally, sufficient lubricity of the mix is not obtained below this minimum limit and slump resistance is usually adversely affected above this maximum limit. However, in particular applications, depending upon the mix ingredients employed, mixes with satisfactory lubricity and slump resistance may be prepared with amounts of water above the generalized maximum limit and below the generalized minimum limit. The preferred range for the water content is between about 4 and about 6 parts water per 100 parts of the particulate refractory material in the mix.

Other components may be added to the binder or to the vibratable mixes to achieve special properties or results. An example would be barium sulfate to prevent aluminum penetration.

The novel vibratable refractory mixes of the invention may be prepared by combining the particulate, non-basic refractory material, the $P_2O_5$ source, the non clay-containing binder and water in the desired amounts and mixing or blending these components.

The vibratable refractory mixes may be used for their intended applications in conventional manner. For example, the mixes are shaped by using metal, wooden or plastic forms. The forms are vibrated by external means such as air or electric driven vibrators.

The following examples demonstrate practice of preferred embodiments of the invention.

EXAMPLE 1

Preparation of a Binder in Accordance with the Invention

A binder in accordance with the invention was prepared as follows: 1.9 parts of methylcellulose (viscosity 4000 cps) were mixed with 21.1 parts of hot water (80°-90° C.). 76.5 parts of cold water (20°-25° C.) were then added and mixing was continued until a smooth dispersion without lumps was obtained. 0.5 part of sodium hexametaphosphate was added to the dispersion with mixing.

49 parts of the resulting dispersion were mixed with 51 parts of colloidal fumed silica to make a binder in accordance with the invention.

EXAMPLE 2

Preparation of a Vibratable Mix in Accordance with the Invention 0.6 part of the binder produced in Example 1 and 5.2 parts of phosphoric acid (80%) were added with mixing to 100 parts of refractory grains which consisted of the following:

| | |
|---|---|
| MULCOA 47 (R-Grade) (a 47 wt. % alumina, 49 wt. % silica grain produced by C-E Minerals) | 46 wt. % |
| Coarse Kyanite (+200 mesh) | 11 wt. % |
| Calcined alumina fines ($Al_2O_3$) (−325 mesh) | 40 wt. % |
| Fine Kyanite (−200 mesh) | 3 wt. % |
| | 100% |

A vibratable refractory mix was obtained.

EXAMPLE 3

A sample of the vibratable refractory mix prepared as described in Example 2 was tested for its shelf life.

The shelf life test was performed by determining the tunnel flow time of the sample as follows: The test is based on observing the way the sample vibrates as a function of time. As the test material ages, the time it takes for the material to fall through a given size funnel (with vibration) becomes longer. After a certain time, the material no longer flows and this is considered to be its shelf life.

The funnel apparatus used was constructed of metal, about 15 inches high and had a base exterior of about 6 by 9 inches. A funnel member is suspended from the top of the apparatus and has interior dimensions of 4 by 4 inches at the top tapering down over 6 inches to 2 by 2 inches at the bottom. A trap door (funnel door) is attached to the bottom of the funnel to contain the sample when the apparatus is loaded. The door may be secured by a clip. The funnel apparatus is bolted to a solid surface and cushioned by a ¼ inch rubber gasket to dampen the vibrations.

In operation, the funnel is sprayed with a release agent (e.g., PAM TM). The funnel door is closed and 1000 grams of the sample mix are added in walnut sized pieces while vibrating. The funnel door is opened and the timer started simultaneously. The vibrated mass is allowed to fall by gravity into a catching pan at the bottom of the funnel. The vibration time is recorded when the mass last falls from the funnel (or at least a major portion of same). In between tests, the vibrated material is sealed from the air and stirred.

The results of the funnel test on the sample of vibratable refractory mix from Example 2 were that the sample was ascertained to have a shelf life of 3 months.

EXAMPLE 4

A sample of vibratable refractory mix prepared as described in Example 2 was tested for its linear change. Refractory test bricks measuring about 230 by 115 or 75 mm in size were prepared by vibrating the mix into forms and drying the shaped material at about 500° C. for a period of 8 hours.

Linear change of the product was determined by ANSI/ASTM Test No. C113-74. The results were as follows:

Linear Change, %

At 230° F. +1.4
At 1600° F. +3.5

Linear change is a standard test for refractory products. The data show that a refractory shape prepared from a vibratable mix in accordance with the invention does not expand or contract excessively during heating. Low expansion and contraction are important in refractory installations.

EXAMPLE 5

A sample of vibratable refractory mix prepared as described in Example 2 was tested for slump resistance as follows:

740 pounds of the vibratable refractory mix obtained according to Example 2 were vibrated into a 2 by 2 by 2 foot Roto pour ladle. Approximately 450 pounds (740) were placed in the ladle and two large brute vibrators operating on the side and one smaller vibrator in the middle were started. Additional mix as needed was added to fill the form. Vibration was continued for approximately 10–15 minutes after the form was filled. After the completion of vibration, the top surface was leveled off with a spade and rammed with a smaller hammer. The interior form was then removed. The shaped mix retained its shape without slumping for at least 30 minutes and was adjudged slump resistant.

We claim:

1. A vibratable refractory mix comprising the following components:
   (a) a particulate, non-basic refractory grain material in an amount sufficient and a sizing suitable to provide refractoriness to said mix,
   (b) a $P_2O_5$ source in an amount sufficient to form a bond with said non-basic refractory material,
   (c) a non-clay containing binder which comprises a blend of a member selected from the group consisting of a cellulose ether, microcrystalline cellulose and polyvinyl alcohol in an amount sufficient to provide slump resistance to said mix after it has been vibrated into a form and the form is removed, and a dry, colloidal, particulate material in an amount sufficient to reduce phosphate migration in said mix, after it has been vibrated into a form and cured by heating, to a maximum acceptable level to achieve satisfactory integrity of the molded refractory product, and
   (d) water in an amount sufficient to provide lubricity to said mix and make it vibratable, but not in an amount which would adversely affect the slump resistance of said mix after it has been vibrated into a form.

2. A vibratable refractory mix according to claim 1 in which the particulate non-basic refractory grain material is selected from grains of alumina-silica, silicon carbide, magnesium-alumina-spinel, zircon, zirconia and alumina-chrome oxide.

3. A vibratable refractory mix according to claim 2 in which the particulate non-basic refractory grain material is alumina-silica.

4. A vibratable refractory mix according to claim 3 in which said grains comprise about 40 to about 75 percent coarse grains in the range of about 3–200 mesh and about 25 to about 60 percent fine grains of −325 mesh.

5. A vibratable refractory mix according to claim 1 in which the $P_2O_5$ source is selected from phosphoric acid, monoaluminum phosphate and monoammonium phosphate.

6. A vibratable refractory mix according to claim 5 in which the $P_2O_5$ source is phosphoric acid.

7. A vibratable refractory mix according to claim 1 in which the $P_2O_5$ source is present in an amount of about 0.5 to about 14 percent based on the weight of particulate refractory material in the mix.

8. A vibratable refractory mix according to claim 1 in which the binder member to provide slump resistance is microcrystalline cellulose.

9. A vibratable refractory mix according to claim 1 in which the binder member to provide slump resistance is polyvinyl alcohol.

10. A vibratable refractory mix according in to claim 1 in which the binder member to provide slump resistance is a cellulose ether.

11. A vibratable refractory mix according to claim 10 in which water is incorporated with said cellulose ether.

12. A vibratable refractory mix according to claim 10 in which said cellulose ether is selected from methylcellulose, ethylcellulose, hydroxypropyl methylcellulose and hydroxybutyl methylcellulose.

13. A vibratable refractory mix according to claim 12 in which said cellulose ether is methylcellulose.

14. A vibratable refractory mix according to claim 13 in which the methylcellulose is present in an amount equal to about 0.1 to about 10 percent based on the total weight of said binder component.

15. A vibratable refractory mix according to claim 12 in which said cellulose ether is present in an amount equal to about 0.0005 to about 60 percent based on the total weight of said binder component.

16. A vibratable refractory mix according to claim 1 in which the binder member to reduce phosphate migration is selected from fumed silica, colloidal silicon carbide and colloidal magnesia-alumina spinel.

17. A vibratable refractory mix according to claim 16 in which said member is fumed silica.

18. A vibratable refractory mix according to claim 17 in which the fumed silica is present in an amount equal to about 40 to about 99.9 percent based on the total weight of said binder component.

19. A vibratable refractory mix according to claim 18 in which the fumed silica is present in an amount equal to about 80 to about 99 percent based on the total weight of said binder component.

20. A vibratable refractory mix according to claim 1 in which said binder component is present in an amount of about 0.1 to about 10 percent based on the weight of the particulate non-basic refractory material in the mix.

21. A vibratable refractory mix according to claim 1 in which water is present in an amount of about 2 to about 15 parts per 100 parts by weight of the particulate non-basic refractory material.

22. A vibratable refractory mix according to claim 1 in which
   (a) the particulate non-basic refractory grain material is grains of alumina-silica comprising about 40 to about 75 percent coarse grains in the range of about 3-200 mesh and about 25 to about 60 percent fine grains of $-325$ mesh,
   (b) the $P_2O_5$ source is phosphoric acid present in an amount based on the total dry weight of the mix to about 0.5 to about 14 percent,
   (c) the binder component is present in an amount of about 2 to about 8 percent based upon the weight of the particulate refractory material in said mix,
   (d) the binder member to provide slump resistance is methyl-cellulose which is present in an amount from about 0.1 to about 10 weight percent based on the total weight of said binder component,
   (e) the binder member to reduce phosphate migration is fumed silica present in an amount from about 80 to about 99 percent based on the total weight of said binder component,
   (f) said binder component includes a deflocculating agent in an amount from about 0 to about 35 percent based on the total weight of said binder component, and
   (g) the water is present in an amount from about 2 to about 15 parts per 100 parts by weight of the alumina-silica.

23. A vibratable refractory mix according to claim 22 in which the deflocculating agent is sodium hexametaphosphate which is present in an amount between about 0 and about 5 percent based on the total weight of said binder component.

* * * * *